United States Patent [19]

Oosuga et al.

[11] Patent Number: 4,494,405
[45] Date of Patent: Jan. 22, 1985

[54] AIR-FLOW METER FOR INTERNAL COMBUSTION ENGINE

[75] Inventors: Minoru Oosuga, Hitachi; Yoshishige Ohyama, Katsuta, both of Japan

[73] Assignee: Hitachi, Ltd., Tokyo, Japan

[21] Appl. No.: 405,321

[22] Filed: Aug. 5, 1982

[30] Foreign Application Priority Data

Aug. 10, 1981 [JP] Japan ................... 56-124059

[51] Int. Cl.$^3$ .................................. G01M 15/00
[52] U.S. Cl. ............................... 73/118; 73/204
[58] Field of Search .................. 73/118, 204, 202; 123/494

[56] References Cited

U.S. PATENT DOCUMENTS

| | | | |
|---|---|---|---|
| 4,264,961 | 4/1981 | Nishimura et al. | 73/204 X |
| 4,369,656 | 1/1983 | Ueno et al. | 73/118 |
| 4,373,387 | 2/1983 | Nishimura et al. | 73/118 X |
| 4,395,907 | 8/1983 | Morita et al. | 73/118 X |
| 4,404,846 | 9/1983 | Yamauchi et al. | 73/118 |

*Primary Examiner*—Jerry W. Myracle
*Attorney, Agent, or Firm*—Antonelli, Terry & Wands

[57] ABSTRACT

An air-flow meter wherein a bypass air passage for bypassing a main air passage is provided in a throttle chamber of an internal combustion engine, and a hot wire is arranged within the bypass air passage, with the amount of air flow being measured on the basis of a change in the resistance of the hot wire. A portion for diverting the direction of air streams is disposed in an upstream part of the bypass air passage so as to assign a dust removing function, and a diameter of the hot wire is selected so that dust particles flowing to the vicinity of the hot wire do not adhere to the hot wire. A surface of the hot wire is coated with glass, and a temperature of the surface of the hot wire is maintained at or above about 100° C. to enhance the prevention of dust particles adhering to the hot wire.

8 Claims, 20 Drawing Figures $Q_1 : D = 2H$
$Q_2 : D = H$
$Q_3 : D = \frac{1}{2}H$ FIG. 12a
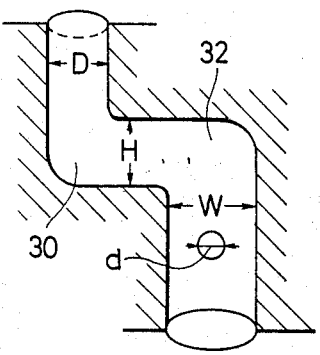
$Q_1 : D = 2H$
$Q_2 : D = H$
$Q_3 : D = \frac{1}{2}H$
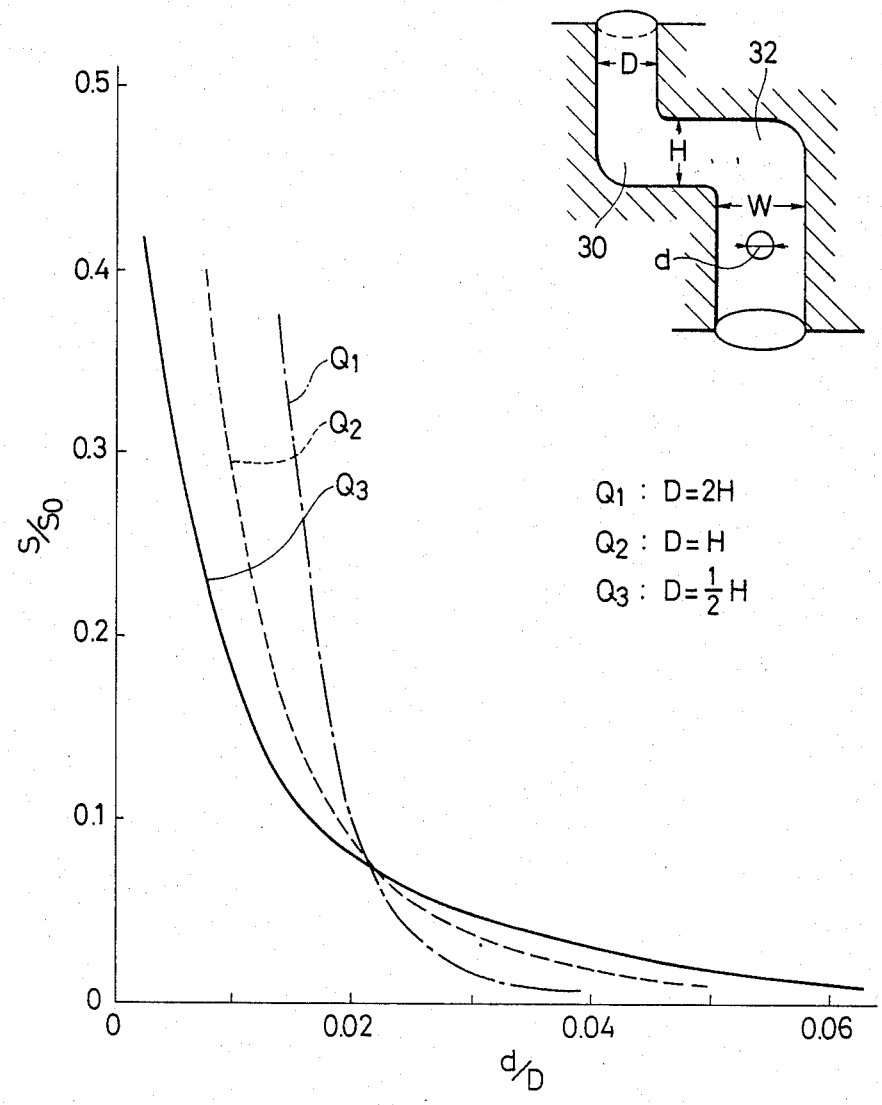
FIG. 12b 4,494,405

AIR-FLOW METER FOR INTERNAL COMBUSTION ENGINE

BACKGROUND OF THE INVENTION

The present invention relates to an air-flow meter for an internal combustion engine and, more particularly, to an air-flow meter for controlling a fuel injector of an internal combustion engine with the air flow meter including and exposed hot wire arranged in an air passage of the internal combustion engine so as to measure the amount of suction air flow.

In order to maintain a proper combustion process in an internal combustion engine, the air-fuel ratio of a mixture to be fed into the internal combustion engine must be maintained at an appropriate value, and the amount of fuel to be injected into a combustion chamber by a fuel injector must be controlled in correspondence with the amount of air flow. Consequently, it is important to accurately sense the amount of air flow into the internal combustion engine.

In, for example, Japanese Laid Open Patent Application No. 56-18721, a hot-wire type air-flow meter for an internal combustion engine is proposed wherein, in order to prevent damage of a hot wire due to a backfire, a bypass air passage for bypassing a main air passage is provided, and the hot wire is arranged in the bypass air passage, with the amount of air flow being sensed on the basis of a change in the resistance of the hot wire. A disadvantage of this arrangement resides in the fact that dust particles flowing from the upper stream of the bypass air passage, pollutant particles contained in a reverse flow gas attributed to backward flow or backfire from the engine, etc. adhere to the hot wire, and an output signal from the hot wire changes with time, so as to result in a large error in the measured value of the amount of air flow.

SUMMARY OF THE INVENTION

An object of the present invention is to avoid the aforementioned disadvantages by providing an air-flow meter for internal combustion engines which has a high reliability.

Another object of the present invention is to provide an air-flow meter for internal combustion engines in which an ouput signal from a hot wire does not change with time.

In accordance with advantageous features of the present invention, a path from the inlet of a bypass passage to a passage part where a hot wire is located has such a shape that dust particles etc. can be removed by the inertial separation, and a diameter of the hot wire is selected so that the dust particles etc. flowing into the passage part where the hot wire is located may not collide against the hot wire.

Other and further objects, features and advantages of the invention will appear more fully from the following description when taken in connection with the accompanying drawings which show, for the purposes of illustration only, several embodiments in accordance with the present invention.

BRIEF DESCRIPTION OF THE DRAWINGS

FIG. 12a is a schematic cross-sectional view of a bypass passage constructed in accordance with the present invention;

FIG. 12b is a graph showing the relationship between the ratio of the diameter of the hot wire to the width of the entrance of the bending portion and the rate of collision of dust particles, in the bypass air passage illustrated in FIG. 8;

FIG. 14b is a partially schematic partial cross-sectional view of a hot wire construction employed to determine the relationship illustrated in FIG. 14a;

DETAILED DESCRIPTION

Figure 1:
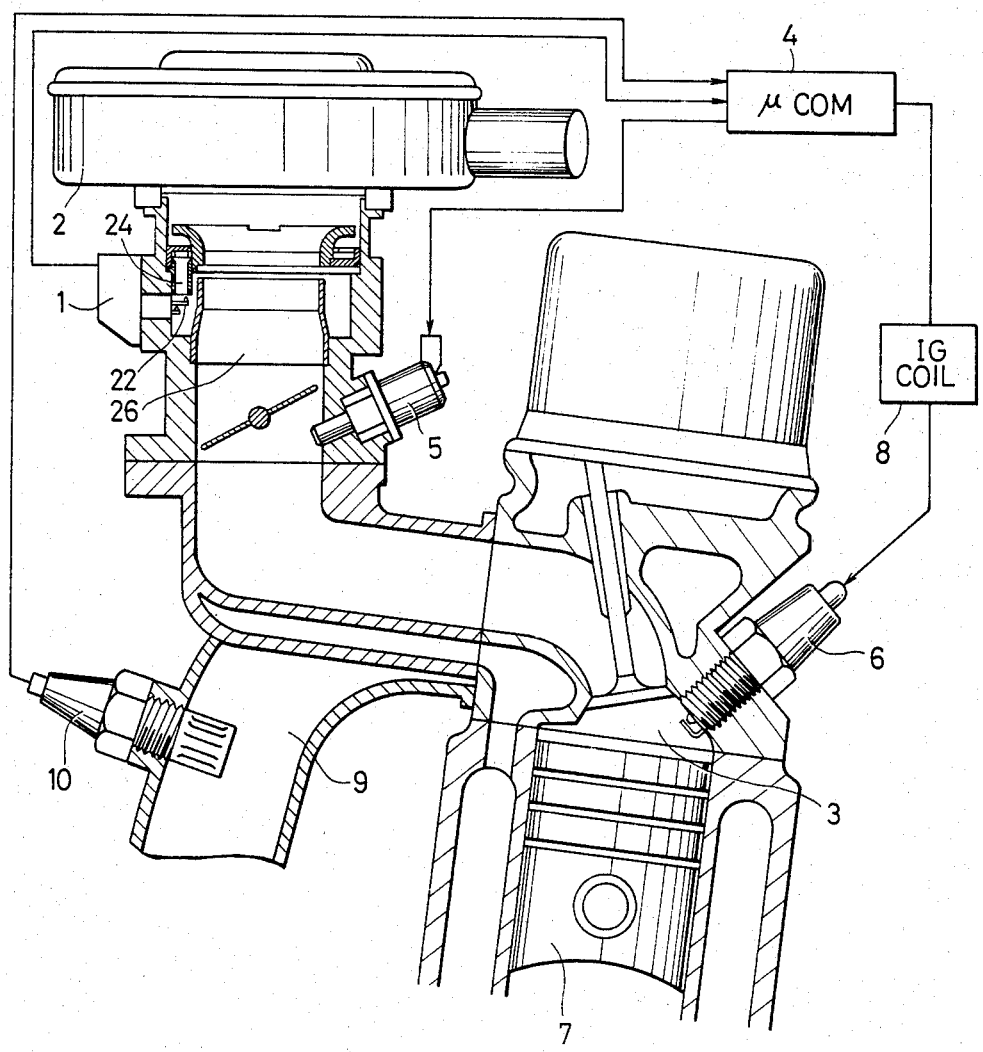
FIG. 1 is a partial cross-sectional view of an internal combustion engine for automobiles to which the present invention is applied.

Referring now to the drawings wherein like reference numerals are used throughout the various views to designate like parts and, more particularly, to FIG. 1, according to this figure, an electronically-controlled fuel injection type engine includes an air-flow meter 1 for detecting an amount of flow of air drawn from an air cleaner 2 into a combustion chamber 3 by suction, with the detected amount of suction air being supplied to a microcomputer 4. The microcomputer 4 computes the amount of fuel supply corresponding to the particular amount of air, and thus controls the amount of fuel to be injected from a fuel injector 5. The fuel-air mixture is fed into the combustion chamber 3 and is fired by an ignition plug 6, so that a piston 7 is pushed down. The ignition timing is controlled by the microcomputer 4, with a control signal from the microcomputer 4 being delivered to an ignition coil 8 which generates a high voltage to thereby spark the ignition plug 6. The resulting exhaust gas is emitted from an exhaust valve (not shown) through an exhaust pipe 9, with the oxygen content of the exhaust gas being detected by an $O_2$-sensor 10. Upon receiving a detection output signal of the $O_2$-sensor 10, the microcomputer 4 compensates the amount of fuel injection so that the air-fuel ratio may become the theoretical value.

The inflowing air from the air cleaner 2 passes through a main air passage 26, and is drawn into the combustion chamber 3 by suction with a part of the suction air being introduced into a bypass air passage 24 so as to be sensed by a hot wire 22 to determine the amount of air flow through the bypass passsage 24 and thereby measure, the amount of flow of the suction air into the combustion chamber 3. When dust is contained in the air passing through the bypass 24, it adheres to the hot wire 22 and increases the resistance of this hot wire 22, so that the amount of air flow cannot be accurately measured. In the present invention the amount of dust to be contained in the air passing near the hot wire 22 is reduced, and, a diameter of the hot wire 22 is selected so that the dust may fail to collide against the hot wire 22. Since dust particles having diameters of about 10 $\mu$m and above are removed by the air cleaner 2, smaller dust particles may be prevented from adhering to the hot wire 22.

Figure 2:
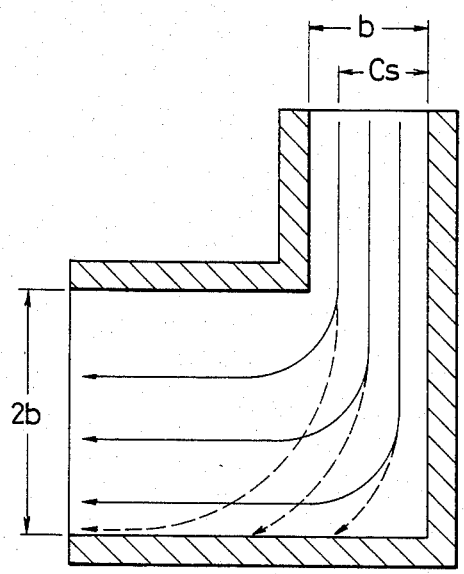
FIG. 2 is a cross-sectional view of a square bent pipe for explaining the principle of dust removal.

As shown in FIG. 2, the section of the entrance of the bending portion is a square of (b×b), and that of the exit is a rectangle of (2b×b). The solid line arrows indicate the streams of air, with the broken line arrows indicating the streams of dust. Since the flow passage curves abruptly, although the air flows while turning along the flow passage, most of the dust particles cannot turn and they are separated from the air streams and collide against the wall of the flow passage. Assuming that the dust particles floating on the air streams flowing within a distance $C_s$ from the surface of the wall located on the outer side of the bending collide against the wall of the flow passage, the factor of collision of the dust particles against the bent wall is expressed by $C_s/b$, and hence, the factor $X_s$ of dust particles passing through the bending portion becomes:

$$X_s = 1 - C_s/b \quad (1)$$

Figure 3:
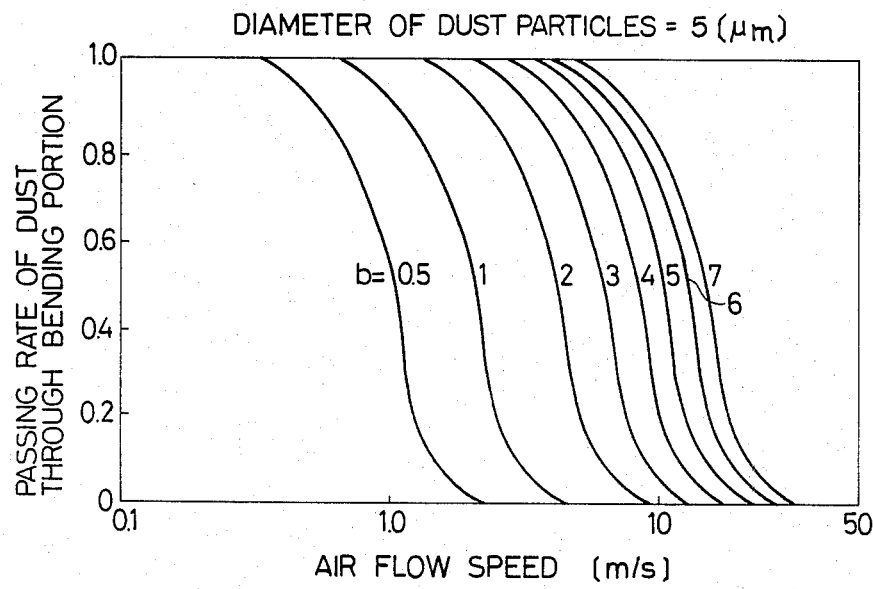
FIG. 3 is a graph illustrating variations in the passing rate of dust particles in the construction of FIG. 2.

When the flow passage is constructed as shown in FIG. 2, the calculated results of the factor $X_s$ of dust particles passing through the bending portion are shown in FIG. 3, where the air flow speed is graduated on a logarithmic scale. In obtaining the results, the streams in FIG. 2 were solved with the potential flow, and numerical analyses were performed by applying the equation of motion of the dust particle to the solution. The diameter of the dust particle at this time was assumed to be 5 $\mu$m taking into consideration the fact that the dust particles arriving through the air cleaner are less than 10 $\mu$m. Additionally, the density of the dust particles was assumed to be 2000 kg/m$^3$, taking into consideration the densities of soil, sand, silicon, sulfur, etc. As shown in FIG. 3, the factor $X_s$ of the dust particles passing through the bending portion varies in dependence upon a slit width b and the air flow speed. It is more difficult for the dust particles to pass through the bending portion as the slit width b is smaller and as the air flow speed is higher.

Figure 4:
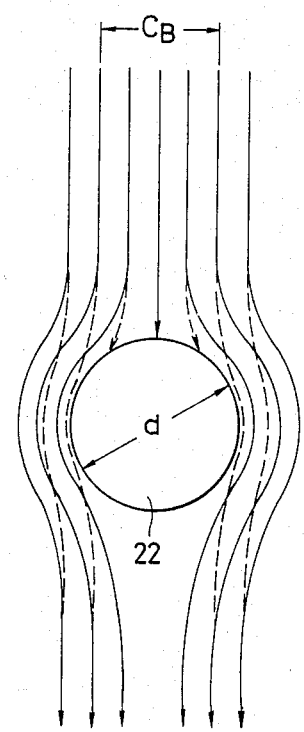
FIG. 4 is an explanatory diagram illustrating a collision of dust particles against a hot wire.

As shown in FIG. 4, the hot wire 22 is a circular cylinder having a cross-sectional diameter d, with the solid line arrows indicating the air streams and the broken line arrows indicating the dust streams. As can be seen in FIG. 4, the air streams avoid the hot wire 22, while the flow of dust particles separate from the air streams near the circular cylinder due to inertia, and those of the dust particles which flow in a vicinity of the axis of the circular cylinder collide against the circular cylinder. Assuming $C_B$ denotes a critical value of the thickness of the air streams for permitting the dust particles to flow without colliding against the circular cylinder, a factor $X_B$ of collision of the dust particles against the circular cylinder is expressed by:

$$X_B = C_B/d \quad (2)$$

Figure 5:
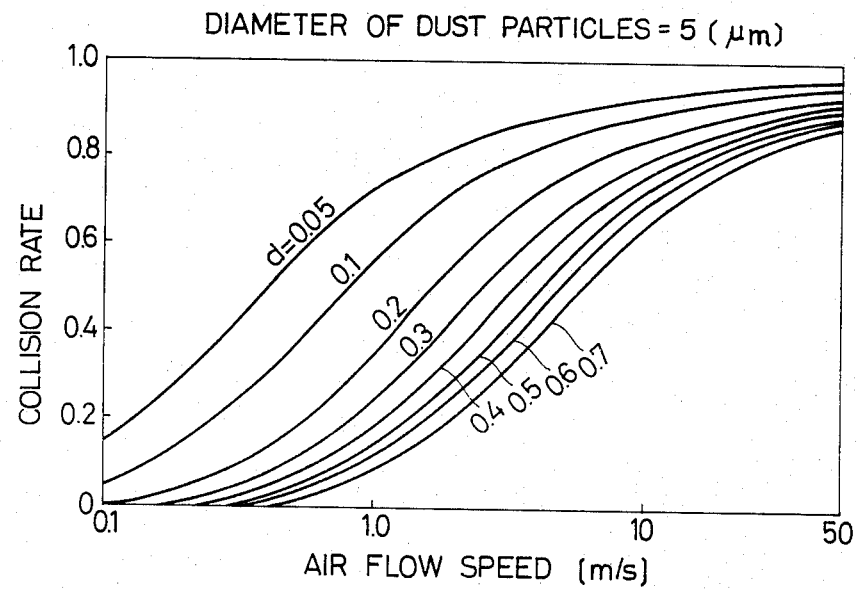
FIG. 5 is a graph illustrating variations in a collision rate of dust particles against the hot wire in the construction of FIG. 4.

FIG. 5 illustrates calculated results of the collision factor $X_B$ of the dust particles against the circular cylinder, with the air flow speed being graduated on a logarithmic scale. The conditions under which the calculation of the collision factor $X_B$ is made are the same as those of FIG. 3. As shown in FIG. 5, the collision factor $X_B$ of the dust particles against the hot wire 22 varies in dependence upon the diameter d of the hot wire 22 and the air flow speed. As the diameter d of the hot wire 22 increases and as the air flow speed is reduced, the collision factor $X_B$ becomes smaller, so that the precision of the air flow value sensed by the hot wire 22 is more enhanced.

As apparent from FIGS. 3 and 5, upon sensing the air flow by providing the bent portion near the inlet of the bypass air passage and arranging the hot wire 22 in the bypass passage, the slit width b of the entrance of the bent portion may be small and the diameter d of the hot wire 22 may be large, in order to prevent the dust particles from adhering to the hot wire 22, these dust particles arriving from the inlet of the bypass passage in a manner so as to coexist with the air. Also, when the air flow speed in the slit portion is high and the air flow speed near the hot wire 22 is low, the adherence of the dust particles to the hot wire 22 is reduced. This measure is achieved by properly selecting a ratio between a cross-sectional area of the bypass passage in a vicinity of the hot wire 22 and that of the passage in the upper stream.

Figure 6:
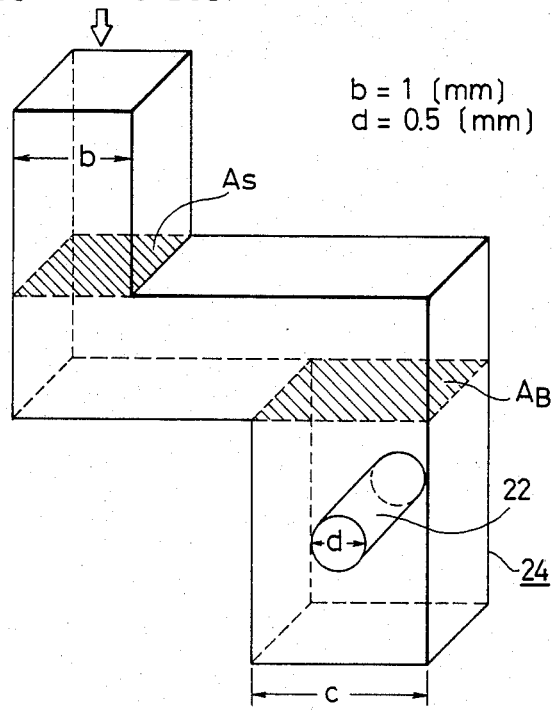
FIG. 6 is a schematic diagram of a bypass air passage formed as a square pipe having a bent portion in an upstream portion thereof.

In FIG. 6 the bypass air passage 24 is fashioned as a crank-like rectangular pipe, in which b denotes the slit width of the upstream part of the bent portion, $A_S$ a cross-sectional area of the slit portion, c a width of a portion of air passage 24 where the hot wire 22 is arranged, $A_B$ a cross-sectional area of a further portion of the air passage 24, and d a diameter of the hot wire 22. The factor $X_B$ of collision of dust particles against the hot wire 22 in the case where air containing the dust particles is caused to flow through the passage 24 was evaluated, with the passage 24 having a slit width b=1 mm and hot wire diameter d=0.5 mm were chosen as examples of practical dimensions. Considering the fact that dust particles having diameters of 5 $\mu$m–10 $\mu$m enter the bypass air passage most frequently after passing through the air cleaner 2, the calculation was conducted for dust particles respectively having diameters of 5 μm and 10 μm.

Figure 7:
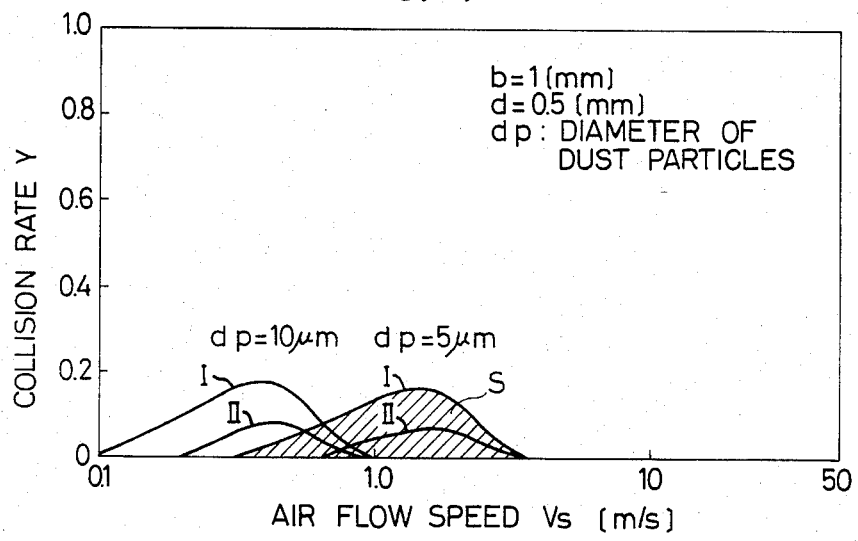
FIG. 7 is a graph illustrating variations in the collision rate of dust particles against a hot wire in the bypass air passage illustrated in FIG. 6.

The results of the above mentioned calculations are illustrated in FIG. 7, wherein curve I represents the collision factor $X_B$ of the dust particles against the hot wire 22, with $A_S$ being equal to $A_B$ so as to equalize an air flow speed $V_S$ in the slit portion and an air flow speed $V_B$ in the passage surrounding the hot wire 22. The curve II represents the collision factor $X_B$, with $A_S:A_B=1:2$ and $V_S:V_B=2:1$. The air flow speed $V_S$ corresponds to the speed at the entrance of the slit portion, and a collision factor Y of the dust particles against the hot wire 22 is obtained by obtaining the product between equations (1) and (2). More particularly, the collision factor Y is expressed by the following relationship:

$$Y = X_S \cdot X_B \quad (3)$$

As shown in FIG. 7, the collision factor Y of the dust particles against the hot wire 22 varies in dependence upon the air flow speed $V_S$, but it is at most about 0.2, which signifies that most of the dust particles do not adhere to the hot wire 22. Further, it has been confirmed that the dust removing effect increases when the passage around the hot wire 22 is increased. It is also noted that the maximum value of the collision factor Y of the dust particles is substantially constant irrespective of the air flow speed $V_S$, and that the difference of the diameters of the dust particles brings forth no considerable difference in the collision factor Y.

Figure 8:
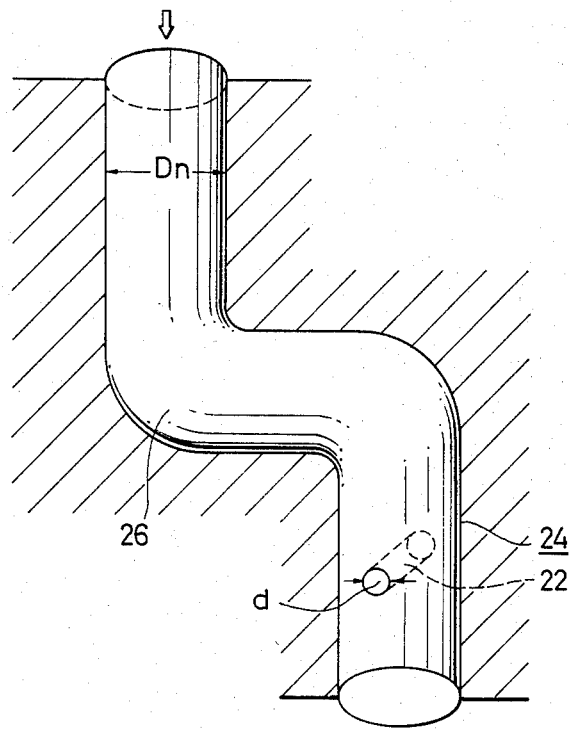
FIG. 8 is a schematic diagram of a bypass air passage formed as a circular pipe having a bent portion at an upstream end thereof.
Figure 9:
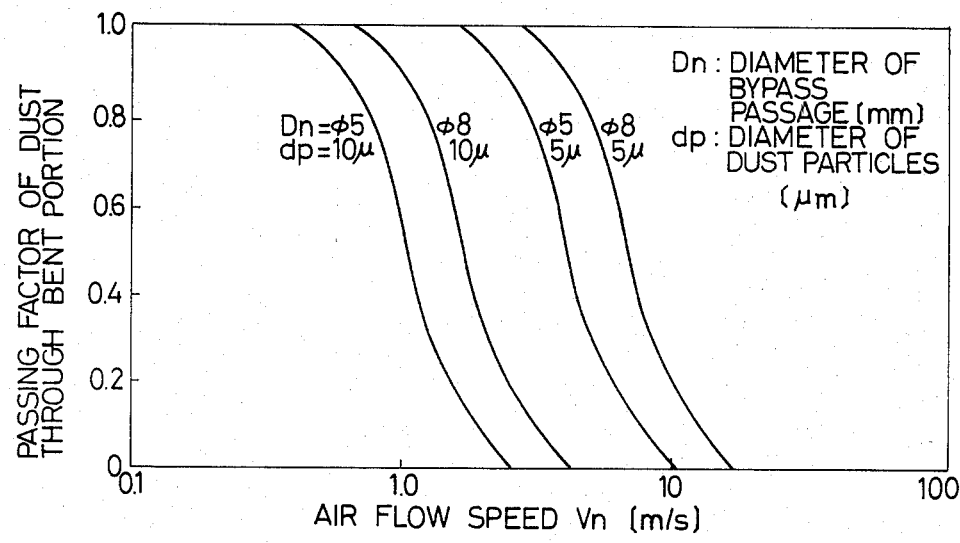
FIG. 9 is a graph illustrating variations in the rate of dust particles passing through the bent portion of the bypass air passage illustrated in FIG. 8.

As shown in FIG. 8, the bypass air passage is cylindrical having a bore diameter $D_n$, and a hot wire diameter d. The hot wire 22 is arranged near an axis of the pipe and FIG. 9 provides an illustration of calculated results of a rate of dust particles passing through the bending portion 26 when air containing the dust particles flows through the passage 24. As apparent from FIG. 9, the results illustrated therein with the bypass air passage of FIG. 8 has the same tendency as illustrated in FIG. 3.

Figure 10:
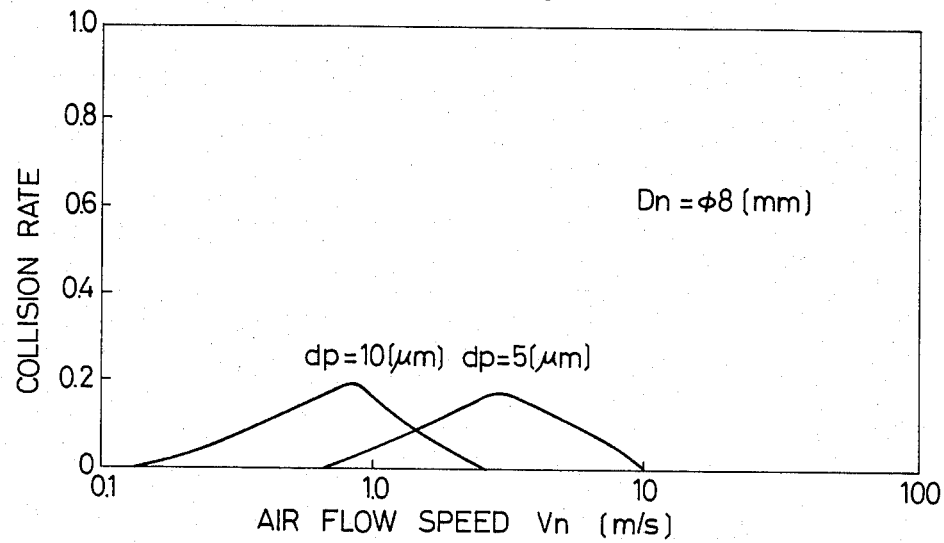
FIG. 10 is a graph illustrating variations in the collision rate of dust particles against a hot wire in the bypass air passage illustrated in FIG. 8.

As apparent from FIG. 10, the calculated results of the collision factor of the dust particles against the hot wire 22 when air containing the dust particles flows through the bypass passage 24 shown in FIG. 8 has the same tendency as shown in FIG. 7. Thus, from FIGS. 9 and 10, it becomes apparent that the bent pipe of a circular cross-section attains the same effects as when the bent pipe is of a square cross-section.

In the instant specification, the width b of the entrance of the bent portion of square pipe section of FIG. 2 or 6, and the diameter D of the entrance of the circular bent portion in FIG. 8, etc. shall be generally termed the "width of the entrance of the bent portion".

As noted hereinabove in connection with FIG. 5, when the diameter d of the hot wire 22 is increased, the collision factor of dust particles against the hot wire 22 is reduced.

When the air flow speed changes into arbitrary values, the integrated value of a collison factor curve, e.g., the area S of a part enclosed with the curve I and the axis of abscissas in FIG. 7 denotes the summation of probabilities at which the dust particles collide against the hot wire 22, and it serves as a criterion for judging whether or not the dust particles easily adhere to the hot wire 22. Therefore, considering what proportion the integral value S of the actual collision factor curve assumes in the integral value $S_o$ of a collision factor curve, assuming that the collision factor is equal to one at the flow speed at which the collision factor curve assumes the maximum value, the quantity of adherence of the dust particles to the hot wire 22 may be determined in accordance with the following relationship:

$$Q = S/S_o \quad (4)$$

Figures 11A, 11B:
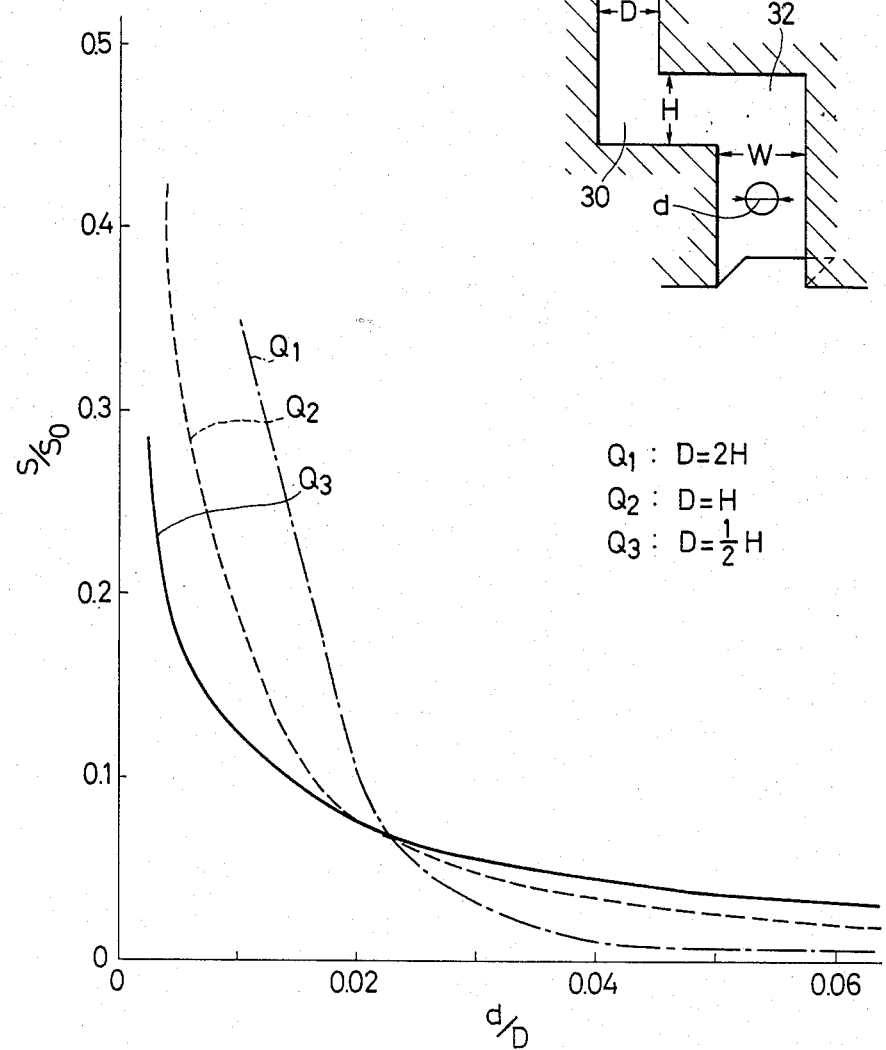
FIG. 11a is a schematic cross-sectional view of a bypass passage constructed in accordance with the present invention.
FIG. 11b is a graph illustrating a relationship between a ratio of a diameter of the hot wire to the width of the entrance of the bending portion and the rate of collision of dust particles, in the bypass air passage illustrated in FIG. 6.

FIG. 11a provides an illustration of the calculated results of variations of the ratio $S/S_o$ dependent upon the ratio (d/D) of the diameter of the hot wire 22 to the width of the entrance of the bent portion, where the hot wire 22 is arranged within the bypass passage having the bent portion in an upstream part thereof, with a bypass passage dimensioned as shown in FIG. 11b. More particularly, in FIG. 11b, the bypass passage has a bent portion 30 with an entrance width D and an exit width H, and a hot wire having a diameter d. As shown in FIG. 11b, the ratio $S/S_o$ increases with a decrease in the ratio d/D irrespective of the dimensions of the bent portion 30. Particularly, when the ratio d/D becomes less than about 0.02, the value $S/S_o$ increases abruptly. In other words, when the ratio d/D is set at about 0.02 or greater, the value $S/S_o$ becomes less than 0.1, and the quantity of adherence of the dust particles to the hot wire 22 can be made very small in practical use. While, in FIG. 11b, the value $S/S_o$ has been calculated by giving the ratio of the diameter d of the hot wire 22 to the diameter D of the entrance of the bent portion 30, results of similar tendency are obtained even when the value $S/S_o$ is calculated by giving the ratio of the diameter d of the hot wire to the exit width H of the exit of the bent portion 32.

The calculated results of variations in the ratio $S/S_o$ in dependence upon the ratio of the diameter d of the hot wire to the diameter D of the entrance of the bent portion, where the hot wire is arranged in the bypass passage of circular cross section (FIG. 12a) having the bent portion at an upstream part thereof is illustrated in FIG. 12b. As with the bypass passage of FIG. 11a, when d/D is smaller than about 0.02, $S/S_o$ increases abruptly, and when d/D is greater than about 0.02, $S/S_o$ can be maintained below 0.1, so that the quantity of adherence of the dust particles to the hot wire becomes very small.

In this manner, the bent portion for diverting the air streams is disposed in the upstream part of the bypass passage, and the ratio of the diameter of the hot wire to the diameter of the bending portion is properly selected, whereby the quantity of dust particles adhering to the hot wire can be extremely reduced to prevent the lowering of an output signal from the hot wire.

Figure 13:
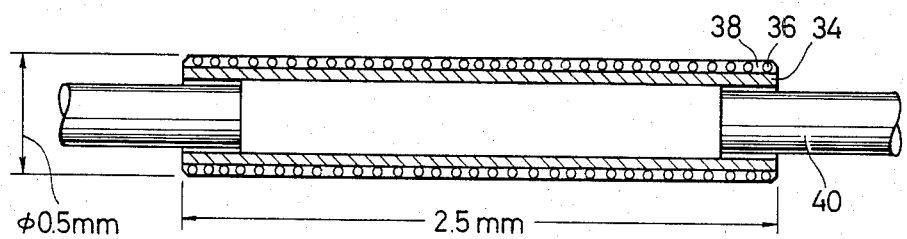
FIG. 13 is a cross-sectional view of a hot wire according to the present invention.

Further, when the hot wire is constructed in the manner illustrated in FIG. 13, wherein a fine wire of platinum or the like is wound on the surface of a ceramic tube and then coated with glass is used as the hot wire, the adherence of dust particles to the hot wire can be further prevented. Referring to FIG. 13, a resistance wire such as platinum wire 36 is wound on the surface of a ceramic tube 34 and is covered with a glass coating 38, with leads 40 being inserted into both the ends of the ceramic tube 34. In FIG. 13, the diameter of the hot wire is 0.5 mm in order to reduce the collision of dust particles to the utmost. Coating the surface of the hot wire with glass in this manner contributes to the prevention of the lowering of the output from the hot wire for the reason that it is difficult for dust to adhere to the glass even when it has collided against the hot wire. Moreover, the heat capacity of the glass film brings forth the effect that, even when air streams have pulsated, the output signal is averaged to fluctuate little.

Since moisture in the air passing through the bypass passage increases the adherence between the dust particles and the hot wire, removing moisture from the air flow is also effective for preventing the colliding dust particles from adhering to the hot wire.

Figure 14A:
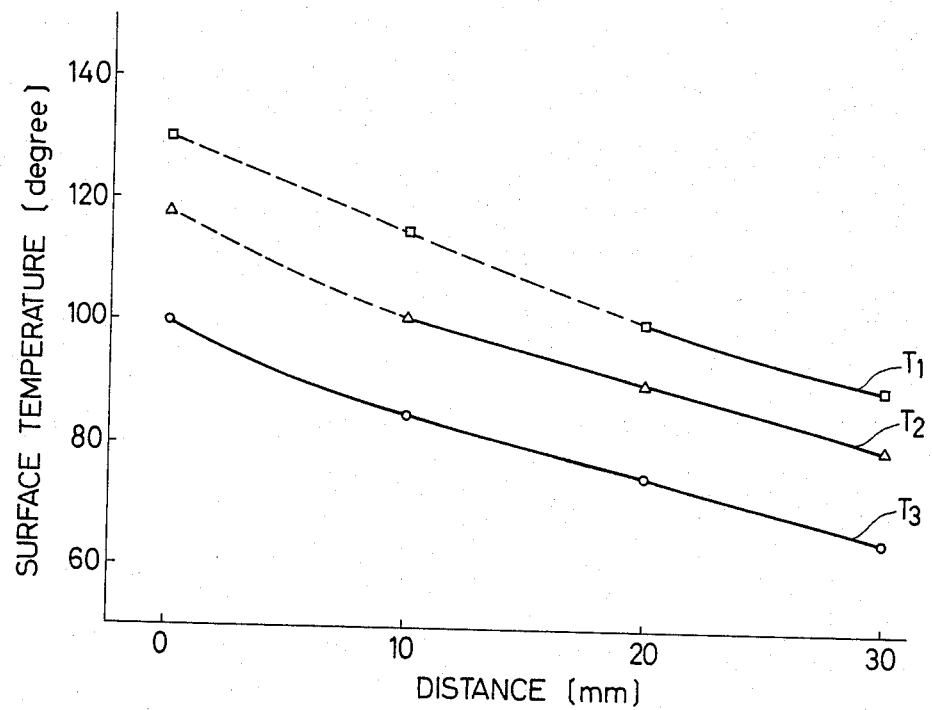
FIG. 14a is a graph illustrating a relationship between a surface temperature of a metal rod and adherence of dust particles.
Figure 14B:
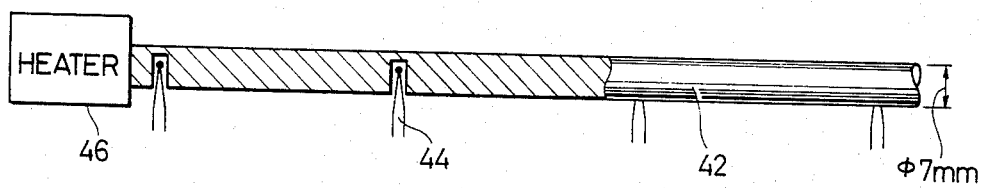

In this connection, FIGS. 14a, 14b illustrate the result of an experiment for clarifying a relationship between the set temperature of the hot wire and the state of adherence of dust particles. As shown in FIG. 14b, a metal rod 42 is provided with recesses at intervals of 10 mm, and thermocouples 44 are inserted therein. While the metal rod 42 was heated in each of three heating modes by a heater 46 located at the left end thereof, test dust particles principally containing $SiO_2$ and mixed in the air were caused to flow from above. When the surface temperature distribution of the metal rod 42 was investigated under such conditions, curves $T_1$-$T_3$ shown in FIG. 14a were obtained. The test dust particles adhered to the metal rod 42 in a temperature range indicated in solid line in FIG. 14a, whereas, the particles did not adhere in a temperature range indicated in broken line. Thus, it has been determined that, when the surface temperature of the metal rod 42 is held at 100° C. or above, the moisture in the air does not adhere to the surface of the metal rod 42, so any adherence of the test dust particles to the metal rod 42 does not exist. accordingly, maintaining the surface temperature of the hot wire placed in the bypass air passage at a temperature of at least 100° C. greatly contributes to the prevention of adherence of dust particles to the hot wire.

Figure 15:
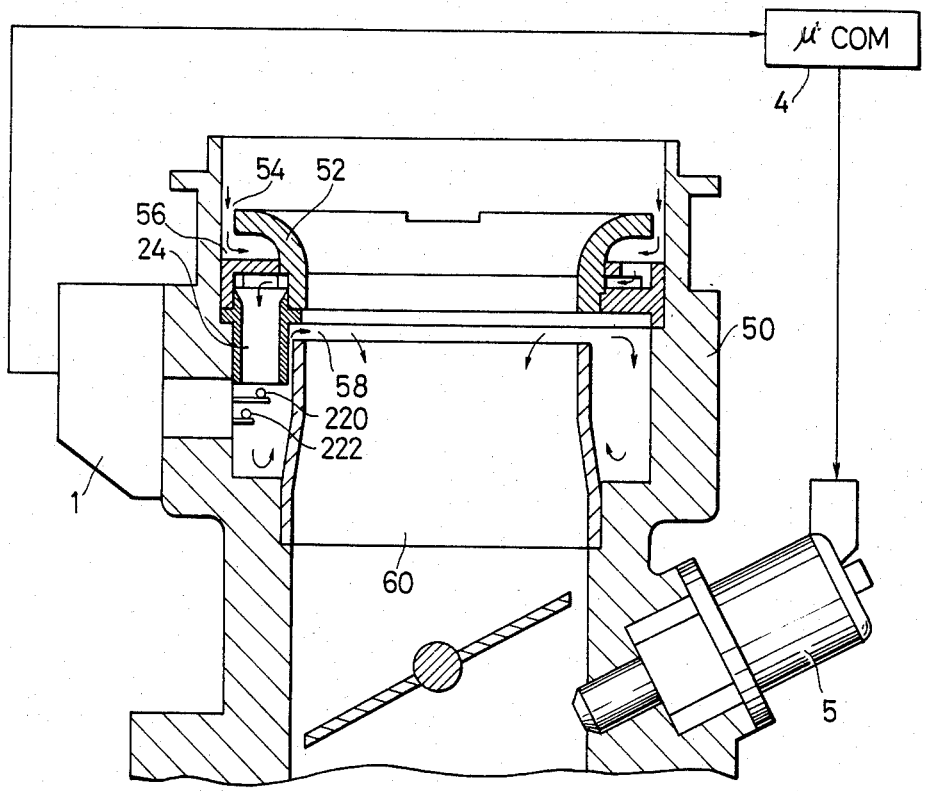
FIG. 15 is a cross-sectional view of a throttle chamber equipped with an embodiment of an air-flow meter according to the present invention.

As shown in FIG. 15, with an air flow meter of the present invention disposed in a throttle chamber, as indicated by the air stream arrows, a portion of the air enters an annular inlet slit 54 formed between the body 50 of the throttle chamber and a bell-mouthed member 52, with the air having the flow direction thereof diverted by a bent portion 56, so as to pass around a hot wire 220 and arrive at a main air passage 60 through an annular outlet slit 58. The amount of air flow through the bypass passage 24 is sensed by the hot wire 220, and a compensation for the sensed amount is provided by an output signal from a temperature-compensating resistance wire 222, whereupon the total amount of the air flowing through the main air passage 60 and the bypass air passage 24 is measured by the air-flow meter 1. A flow signal provided from the air-flow meter 1 is applied to the microcomputer 4, which delivers a control signal to the fuel injector 5 so as to inject a suitable quantity of fuel. In FIG. 15, the upstream portion of the bent portion 56, i.e., the entrance slit 54 has a width D=1 mm and the hot wire 220 has a diameter d=0.5 mm, so that d/D=0.5 which satisfies d/D≧0.02. Therefore, the dust particles mixed in the air are prevented from colliding against the hot wire 220. Furthermore, even when a slight amount of dust has collided against the hot wire 220, the dust particles do not adhere to the hot wire 220 because the hot wire 220 is constructed as glass-coated hot wire of the type illustrated in FIG. 13 and the surface temperature thereof is maintained at 100° C. or above. Accordingly, an output signal from the hot wire 220 does not change, and an accurate air-flow measurement is realized. In addition, in the embodiment of FIG. 15, the inlet slit 54 of the bypass air passage 24 is open in the flowing direction of the main air streams. Therefore, an occurence of turbulent flow is difficult in the air flowing through the bypass passage 24, and the fluctuation of the output signal of the hot wire 220 is suppressed.

Figure 16:
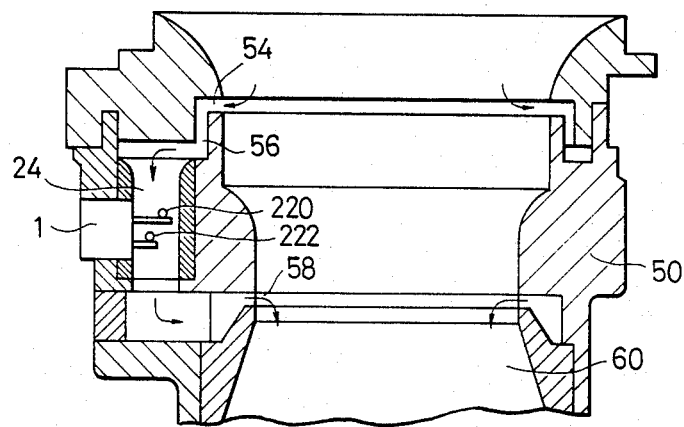
FIG. 16 is a cross-sectional view of another embodiment of the air-flow meter according to the present invention.

In FIG. 16, the width D of the annular entrance slit 54 is 1 mm and the diameter d of the hot wire 220 is 0.5 mm, so that d/D≧0.02. Accordingly, the collision of dust particles against the hot wire 220 is prevented. Moreover, the opening direction of the entrance slit 54 of the bypass air passage 24 is perpendicular to the flowing direction of the main air streams, and when the air flows from the entrance slit 54 into the bypass air passage 24, the direction of the air streams change. Therefore, the quantity of dust particles flowing into the bypass air passage 24 is smaller than in the type illustrated in FIG. 15, and the function of removing dust is more enhanced.

Figure 17:
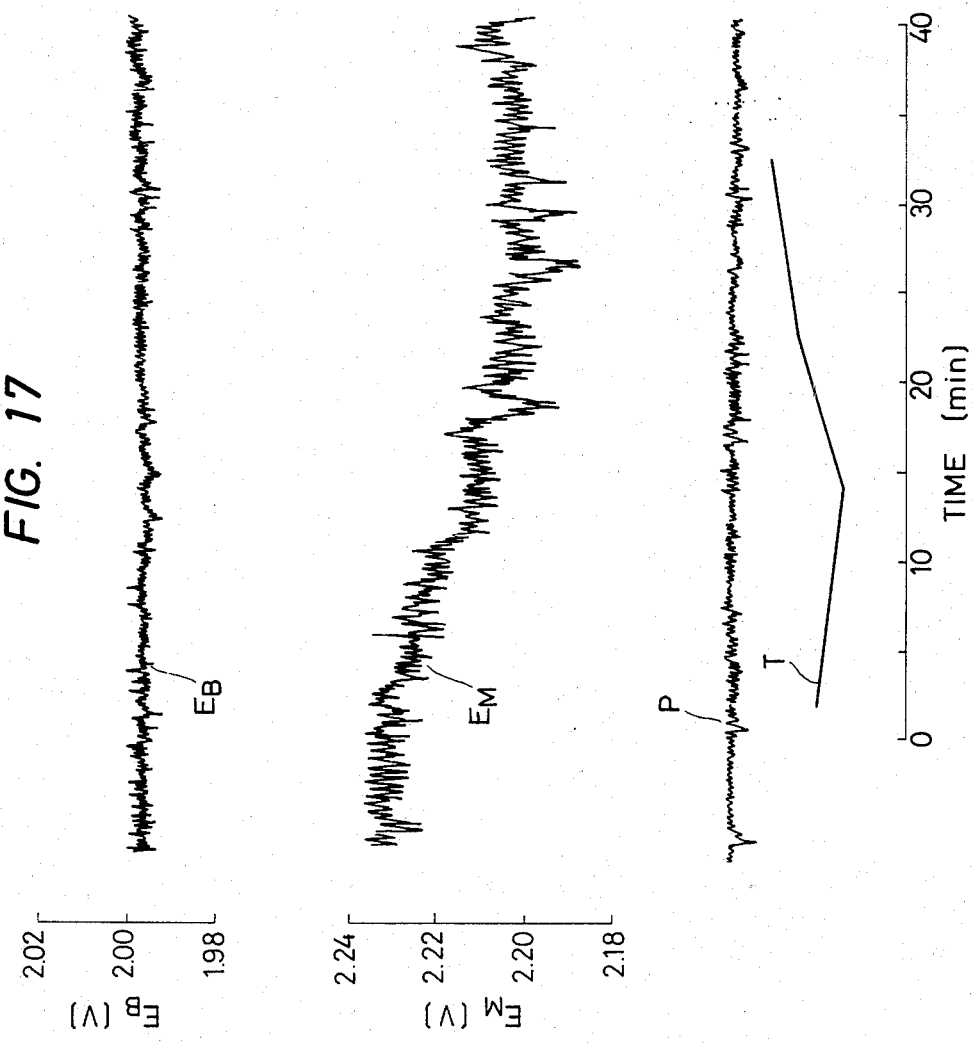
FIG. 17 is a graph illustrating variations-with-time in an output value of the air-flow meter of FIG. 15.

To determine the effectiveness of the air flow meter in the embodiment of FIG. 15, experiments were conducted wherein air containing large quantities of dust were directed through the air flow meter to simulate actual repeated operation of an internal combustion engine installed in a motor vehicle. In the experiments, hot wires having diameters of 0.5 mm were arranged in both the main air passage and the bypass air passage, with negative pressures before and behind the air-flow meter were kept unchanged and the ambient air temperature was kept substantially constant, while test dust particles were caused to flow through both the passages at a rate of 3.0 gr/hour. In FIG. 17, $E_B$ represents the output of the hot wire placed in the bypass air passage, $E_M$ the output of the hot wire placed in the main air passage, P the negative pressure before and behind the air-flow meter, and T the ambient air temperature. The test dust particles began to flow at time=0 min., and a time interval until the lapse of 30 min. corresponded to an actual running distance of 100,000 km. As apparent from FIG. 17, the output $E_M$ of the hot wire placed in the main air passage provided with no means for removing dust lowers with the lapse of time and exhibits values smaller than actual amounts of air flow, whereas the output $E_B$ of the air-flow meter according to the present invention does not change with time, which signifies that an accurate air-flow measurement is achieved.

In accordance with the present invention, an air-flow meter for internal combustion engines is provided which produces output values free from changes over time, and which exhibits a high reliability as well as a high precision.

What we claim is:

1. An air-flow meter for an internal combustion engine, the air flow meter comprising:
    a main air passage means for enabling an air flow therethrough, said main air passage means including a Venturi portion means;
    a bypass air passage means for bypassing said main air passage, said bypass air passage means including an inlet means and an outlet means, said inlet means opening at a position upstream of the Venturi portion, said outlet means opening at a position downstream the Venturi portion, said bypass air passage means further including at least one bent portion therein for removing dust particles in the air flowing therethrough;
    at least one hot wire means disposed in the bypass passage means at a position downstream of said bent portion, said hot wire being adapted to change resistance in dependence upon an amount of air flow in said bypass passage means;

means for detecting the change of resistance of said hot wire means and for measuring the amount of air flow;

means for maintaining a surface temperature of said hot wire at 100° C. or above; and wherein said bent portion has an entrance width D, said hot wire means has a diameter d, and wherein a ratio of d/D is such that collision of dust in the air flowing through said bypass passage means against said hot wire means is substantially prevented.

2. An air-flow meter according to claim 1, wherein said ratio of d/D is greater than 0.02.

3. An air-flow meter according to one of claims 1 or 2, wherein said inlet means of said bypass passage means opens in parallel to a direction of air flow in said main air passage means.

4. An air-flow meter according to one of claims 1 or 2, wherein said inlet means of said bypass passage means open perpendicularly to a direction of air flow in said main air passage means.

5. An air-flow meter according to claim 4 wherein said hot wire means comprises a ceramic cylinder, a resistance wire would around said ceramic cylinder, and a glass coating surrounding said resistance wire.

6. An air flow meter for an internal combustion engine, the air flow meter comprising a main air passage means for enabling an air flow therethrough, said main air passage means including a venturi portion means; a bypass air passage means for bypassing said main air passage, said bypass air passage means including an inlet means and an outlet means, said inlet means opening at a position upstream of the venturi portion, said outlet means opening at a position downstream of the venturi portion, said bypass air passage means further including at least one bent portion therein for removing dust particles in air flowing therethrough; at least one hot wire means disposed in the bypass passage means at a position downstream of the bent portion, said hot wire means being adapted to change resistance in dependence upon an amount of air flow in said bypass passage means, said hot wire means comprises a ceramic cylinder, a resistance wire would around said ceramic cylinder, and a glass coating surrounding said resistance wire; means for detecting a change of resistance of said hot wire means and for measuring the amount of air flow; and means for maintaining a surface temperature of said hot wire means at 100° C. or above.

7. An air-flow meter according to claim 6, wherein said inlet means of said bypass passage means opens in parallel to a direction of air flow in said main air passage means.

8. An air-flow meter according to claim 6, wherein said inlet means of said bypass passage means open perpendicularly to a direction of air flow in said main air passage means.

* * * * *